US006967046B2

(12) United States Patent
Bollinger et al.

(10) Patent No.: US 6,967,046 B2
(45) Date of Patent: Nov. 22, 2005

(54) STICKERS WITH POCKETS

(76) Inventors: Marilyn Bollinger, 1332 Landfall Dr., Wilmington, NC (US) 28405; Howard Bollinger, 1332 Landfall Dr., Wilmington, NC (US) 28405

(*) Notice: Subject to any disclaimer, the term of this patent is extended or adjusted under 35 U.S.C. 154(b) by 22 days.

(21) Appl. No.: 10/625,351

(22) Filed: Jul. 23, 2003

(65) Prior Publication Data

US 2005/0019518 A1 Jan. 27, 2005

(51) Int. Cl.[7] .......... B32B 9/00

(52) U.S. Cl. .......... 428/40.1; 428/42.1; 428/43; 428/124; 428/126; 428/138; 428/192; 428/194; 428/201

(58) Field of Search .......... 428/40.1, 42.1, 428/43, 201, 192, 194, 138

(56) References Cited

U.S. PATENT DOCUMENTS

| | | | | |
|---|---|---|---|---|
| 1,405,134 A | | 1/1922 | Hoyme | |
| 2,420,045 A | * | 5/1947 | Krug | 40/306 |
| 2,946,137 A | | 7/1960 | Worth et al. | 35/35 |
| 3,274,706 A | | 9/1966 | Friend | 35/20 |
| 3,316,669 A | | 5/1967 | Nachbar | 40/142 |
| 3,370,365 A | | 2/1968 | Vosbikian | 40/10 |
| 4,868,027 A | | 9/1989 | Hunkeler et al. | 428/42 |
| 5,659,987 A | | 8/1997 | Scheggetman | 40/299 |
| 5,776,571 A | | 7/1998 | Michlin et al. | 428/40.1 |
| 5,868,498 A | * | 2/1999 | Martin | 383/11 |
| 2003/0021931 A | | 8/1999 | Schnitzer et al. | 428/40.1 |

FOREIGN PATENT DOCUMENTS

| | | | |
|---|---|---|---|
| AU | 609023 | 4/1991 | G09F 3/10 |
| EP | 0 301 814 | 2/1989 | G09F 3/02 |

* cited by examiner

*Primary Examiner*—Nasser Ahmad
(74) *Attorney, Agent, or Firm*—Wood, Herron & Evans, LLP

(57) ABSTRACT

An adhesive-based sticker for adhering to a surface and incorporating a pocket between the surface and the sticker for insertion of objects into the pocket and removal therefrom. A sticker substrate is provided with a first section and a flap section with a fold line therebetween. An adhesive is provided on at least a portion of the back surface, and upon folding the flap section at the fold line, the back surface of the flap section is adhered to a portion of the back surface of the first section. When the sticker substrate is applied to a mounting surface, a pocket is formed between the sticker substrate and the mounting surface in registry with at least the portion of the flap section adhered to the first section. The pocket so formed may be bound around the entire perimeter excluding the fold line or may be a through-pocket. Also provided is a sticker kit including one or more adhesive-backed stickers with pocket means and one or more non-adhesive objects sized in at least a portion thereof to be inserted into the sticker pocket.

39 Claims, 9 Drawing Sheets

STICKERS WITH POCKETS

FIELD OF THE INVENTION

This invention relates to an adhesive sticker having one or more pockets formed between the sticker substrate and the surface to which the sticker is adhered, and sticker kits including one or more such stickers and one or more objects for inserting into the sticker pocket(s).

BACKGROUND OF THE INVENTION

Stickers have a wide variety of uses, including informational labels, children's play stickers, and numerous uses in between. Some labels are permanently adhered or substantially permanently adhered to a mounting surface, while other stickers include an adhesive that allows the sticker to be removed and re-adhered to a mounting surface, where such adhesives are well known in the art. Stickers may be mass produced by a continuous process that includes die cutting a sticker substrate to a desired shape, printing desired markings on a front surface of the sticker, applying adhesive to the back surface of the sticker, and placing the sticker adhesive-side down onto a release liner. The consumer can then remove the sticker from its release liner and place it on a desired surface. Given the vast variety of uses for stickers, any improvement to a sticker design can have far reaching benefits in numerous industries. There is thus a need for an improvement to a sticker design to increase its usefulness.

SUMMARY OF THE INVENTION

The present invention provides an adhesive-based sticker that when placed against a surface incorporates a pocket between the surface and the sticker such that objects can be inserted into the pocket and removed therefrom. To this end, a sticker substrate is provided with a first section and a second section, or flap section, adjacent the first section with a fold line between the two sections. An adhesive is provided on at least a portion of the back surface, such that upon folding the flap section at the fold line, the back surface of the flap section is adhered to a portion of the back surface of the first section. When the sticker substrate is applied to a mounting surface, a pocket is formed between the sticker substrate and the mounting surface in registry with at least a portion of the flap section, specifically, the portion where the flap section is adhered to the first section. In one embodiment of the present invention, the flap section extends from the fold line away from the perimeter of the first section, such that upon adhering the flap section to the first section, the pocket is formed adjacent the edge or perimeter of the sticker. A pocket so formed may be bound around the entire perimeter excluding the fold line or may be a through-pocket. In another embodiment of the present invention, the flap section may also be located within a perimeter of the first section, by use of a die cut line, such that upon folding the flap section at the fold line, a pocket is created within the sticker perimeter. The sticker of the present invention may include one or a plurality of flap sections for creating pockets.

The present invention further provides a sticker kit comprising an adhesive-backed sticker as described above, and further including one or more non-adhesive objects sized in at least a portion thereof to be inserted into the pocket formed upon adhering the sticker to a surface. By the present invention, object-receiving pockets are easily formed to allow the sticker to be used for holding numerous items.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 2A depicts the sticker prior to creating the pocket, and FIG. 2B depicts the sticker after creating the pocket. FIG. 2C further depicts the sticker adhered to a mounting surface and an object inserted in the pocket.

DETAILED DESCRIPTION

Figure 1A:
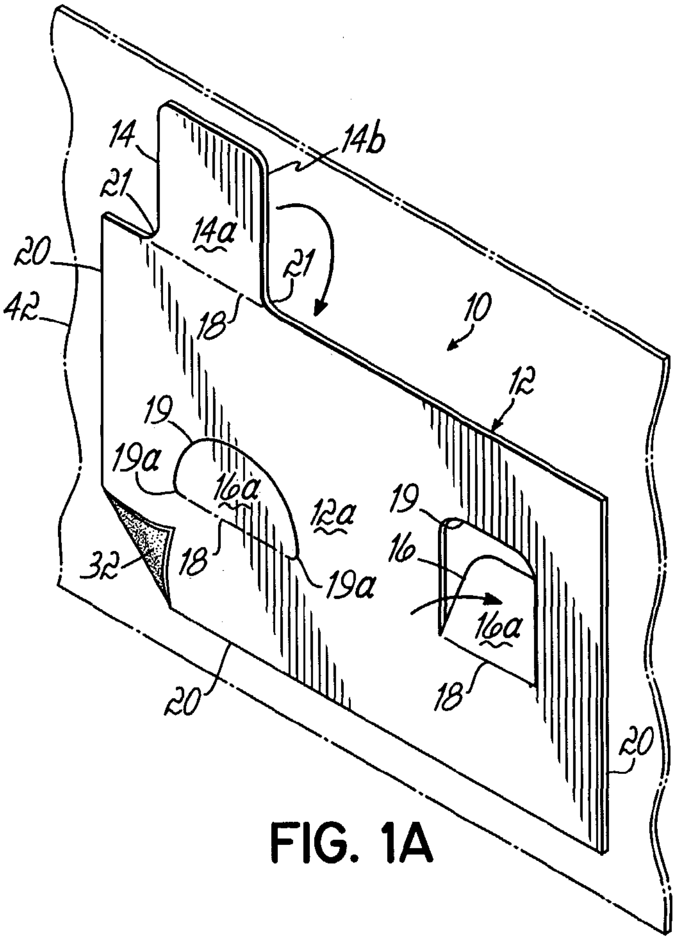
FIGS. 1A and 1B are perspective views of an adhesive-backed sticker of the present invention having a plurality of flap sections for forming pockets in accordance with the present invention, with FIG. 1A depicting the sticker on a release liner prior to forming the pockets, and FIG. 1B depicting the sticker after forming the pockets, respectively.

The present invention provides an adhesive-backed sticker with either permanent or releasable type adhesive, where the sticker substrate is die cut so as to incorporate one or more flap sections around its periphery or within its periphery, which sections are foldable along a fold line to adhere the flap to a portion of the back surface of the sticker substrate such that when the sticker is adhered to a mounting surface, such as a wall, a pocket is formed between the surface and the flap. Non-adhesive objects can then be inserted into the pocket and removed therefrom, as desired. The invention may be best understood with reference to the figures wherein like reference numerals are used throughout the figures to refer to like parts.

FIG. 1A is a perspective view of a sticker or sticker substrate 10 having a first section 12 constituting a main portion of the sticker, and flap sections 14, 16 adjacent the first section 12 with a fold line 18 therebetween. First section 12 has a front surface 12*a* and a back surface 12*b*, and flap sections 14, 16 likewise have front surfaces 14*a*, 16*a* and back surfaces 14*b*, 16*b*, respectively. At least a portion of the back surface of sticker substrate 10, which includes back surfaces 12*b*, 14*b* and 16*b*, is coated with an adhesive 32, and the sticker substrate 10 is advantageously removably adhered to a release liner 42.

Figure 1C:
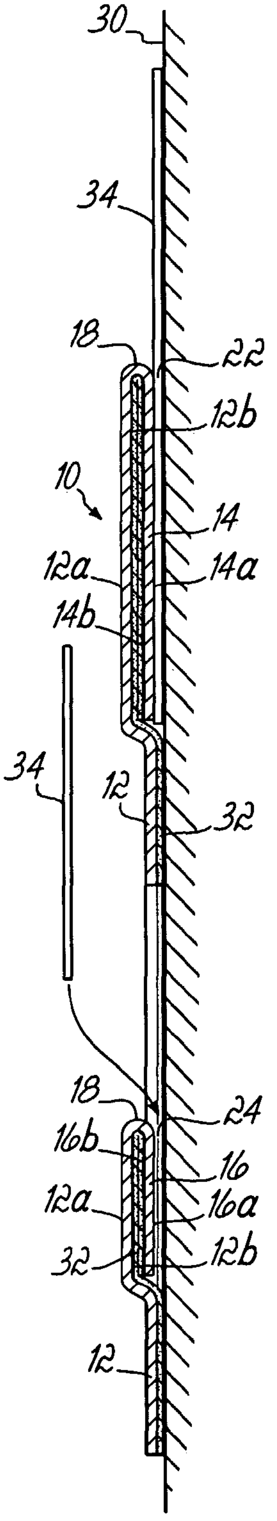
FIG. 1C is a cross-sectional view of the sticker of FIG. 1B taken along line 1C, as applied to a mounting surface, and having an object inserted into a pocket.
Figure 1B:
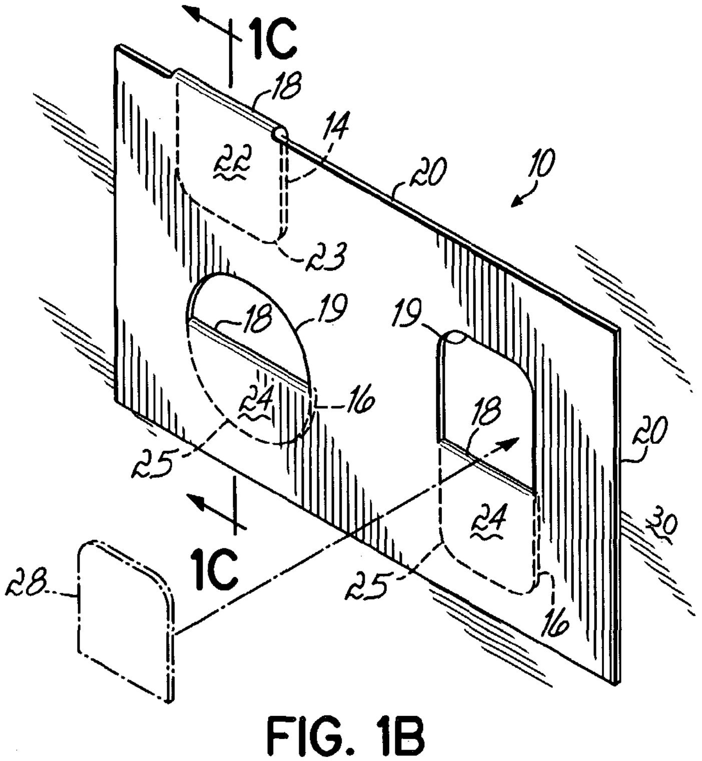

FIG. 1B depicts in perspective view the sticker substrate 10 removed from the liner 42 and having the flap sections 14, 16 folded along their respective fold lines 18 to form pockets 22, 24 in registry with the flap sections 14, 16 and the portions of the first section 12 to which the flap sections 14, 16 are adhered. Flap section 14 extends from the fold line 18 away from the perimeter 20 of the first section 12 in a first direction. When flap section 14 is folded to form pocket 22, the first section 12 extends beyond the pocket 22 in the directions perpendicular to the first direction as well as in a direction opposite the first direction, such that upon adhering the sticker substrate 10 to a mounting surface 30, the pocket 22 is bound around the perimeter 23 of the pocket 22 excluding the fold line 18. Flap sections 16 are located within the perimeter 20 of the first section 12, and the perimeters 25 of the flap sections 16 are defined by the fold line 18 and a die cut line 19. When flap sections 16 are folded to form pockets 24, the first section 12 extends beyond the pockets 24 around the portion of the perimeter 25 of flap section 16 defined by the die cut line 19, such that upon adhering the sticker substrate 10 to a mounting surface 30, the pockets 24 are bound around the perimeters 25 of the pockets 24 excluding the fold lines 18. FIG. 1B further depicts a separate sticker insert 28, which may be provided with the sticker substrate 10, the insert 28 being sized to fill the void created by folding back flap section 16. Thus, where the front surface 12*a* of the sticker substrate 10 contains graphics, insert 28 may be used to prevent a void in the graphics.

FIG. 1C is a cross-sectional view of sticker substrate 10 taken along line 1C of FIG. 1B, with the sticker substrate 10 being applied to a mounting surface 30. The back surfaces 12*b*, 14*b* and 16*b* include an adhesive 32 thereon, wherein the adhesive on back surface 14*b* of flap section 14 and the adhesive on a first region of back surface 12*b* of first section 12 adhere the flap section 14 to the first region of first section 12. Similarly, the adhesive on back surface 16*b* and another first region of back surface 12*b* of first section 12 adheres flap section 16 to first section 12. The adhesive on a second region of the back surface 12*b* of the first section adheres the sticker substrate 10 to the mounting surface 30. Within pocket 22, the front surface 14*a* of flap section 14 resides against mounting surface 30, and contains no adhesive thereon, such that an object 34 can be inserted into pocket 22, as shown. Similarly, front surface 16*a* of flap section 16 resides against mounting surface 30 with no adhesive thereon to permit another object 34 to be inserted into pocket 24. The radius formed at fold line 18 assists in easy insertion of an object 34 into either pocket 22 or 24. FIGS. 1A and 1B further show rounded edges 21 on flap section 14 and extended rounded edges 19*a* at die cut line 19 for flap 16. When flap sections 14 and 16 are folded at fold lines 18, radiused edges 19*a*, 21 are formed that provide a stress relief advantage for the pockets 22 and 24. As a result, as objects 34 are inserted into, and removed from, pockets 22 and 24, the sticker substrate 10 is less likely to tear at corners.

Figure 2A:
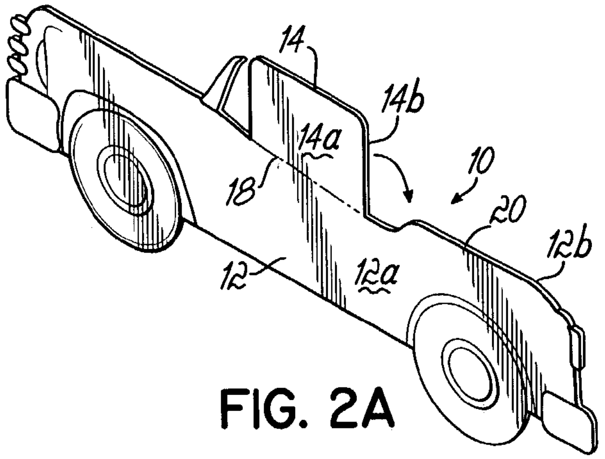
FIGS. 2A and 2B are perspective views and FIG. 2C is a plan view of an embodiment of the invention having a pocket formable at the perimeter of the sticker.
Figure 2B:
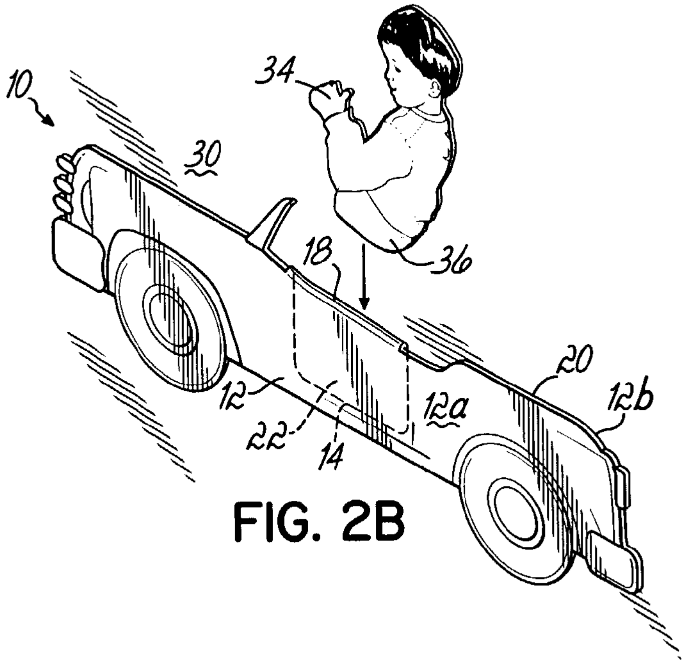
Figure 2C:
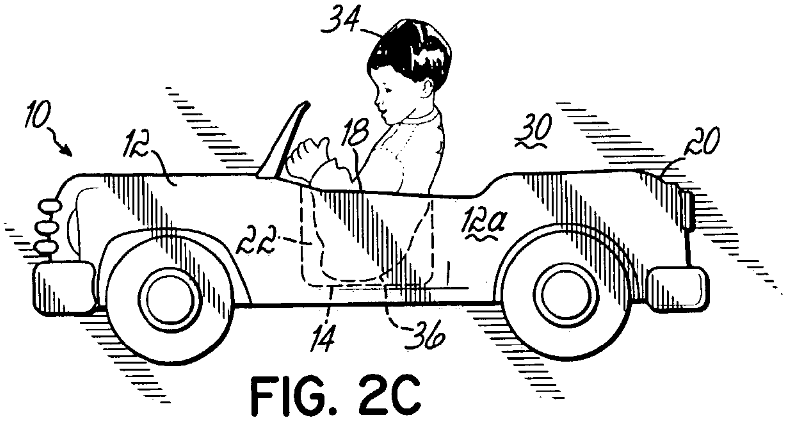

FIG. 2A depicts in perspective view a toy sticker substrate 10 depicting a car and having a first section 12 and a flap section 14 extending from fold line 18 away from perimeter 20 of the sticker substrate 10. FIG. 2B depicts the flap section 14 folded along fold line 18 to adhere its back surface 14*b* to a portion of the back section 12*b* of the first section 12 by means of an adhesive (not shown) to form a pocket 22. An object 34, such as a thin cardboard piece illustrating a driver for the car, has a portion 36 sized to be received within the pocket 22. FIG. 2C depicts the sticker substrate 10 adhered to a mounting surface 30 and the object 34 having its portion 36 inserted into the pocket 22. In accordance with the present invention, a kit may be provided having a plurality of objects 34, such as different people, to allow a child to change from one object 34 to another object 34 in the pocket 22 formed between a mounting surface 30 and the sticker substrate 10 in registry with the flap section 14 and the portion of the first section 12 to which the flap section 14 is adhered. Similarly, the kit may be provided with more than one sticker 10 having a pocket 22 formed therein such that the objects 34 may be moved from one pocket 22 to another pocket 22. The adhesive 32 may be a removable adhesive, which is well known in the art, to allow, for example, a child to play with the stickers on a wall or other object where permanent adhesion is not desired.

Figure 3:
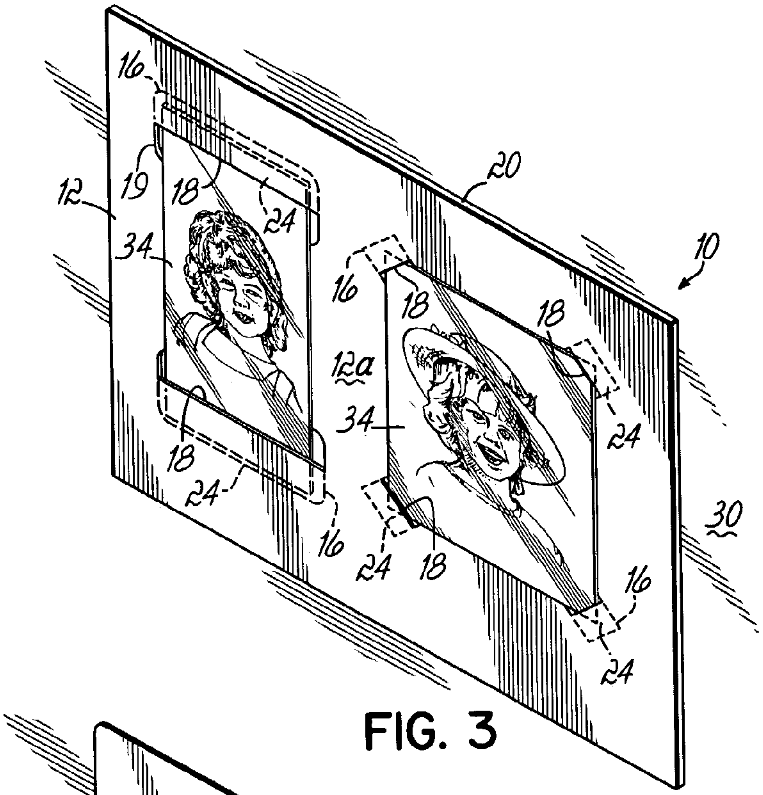
FIG. 3 is a perspective view of an embodiment of the invention having opposing pockets formed within the perimeter of the sticker, for example, for mounting photos or like materials.

FIG. 3 depicts in perspective view an embodiment of the present invention of a sticker substrate 10 for mounting pictures, cards or the like. As shown on the left side of the sticker substrate 10, a pair of opposing flap sections 16 are located within the perimeter 20 of the first section 12, each extending from a respective fold line 18 in a direction opposite the other flap section in the pair, such that upon folding back the flap sections 16 and adhering the sticker substrate 10 to a mounting surface 30, opposing pockets 24 are formed for receiving opposing ends of an object 34. As shown on the right side of the sticker substrate, two pairs of opposing flap sections 16 are located within the perimeter 20 of the first section 12, each flap section 16 extending from its respective fold line 18 in a direction opposite the other flap section 16 in the pair, and the two pairs are positioned to receive respective opposing corners of a quadrilateral object 34, such as a square or rectangular photograph, in pockets 24 upon folding the flap sections 16 and adhering sticker substrate 10 to a mounting surface 30. Thus, a photograph, card or the like may be end mounted or corner mounted by means of the pockets 24 formed in sticker substrate 10. A sticker substrate 10 of the type shown in FIG. 3 could, for example, be used in place of magnets for displaying pictures on a refrigerator, a filing cabinet, a desk drawer, a computer, a wall or the like. The sticker substrate may also be provided with decorative print (not shown) on the front surface 12*a* of the first section 12, for example, to provide a picture frame border or a holiday theme for displaying holiday cards.

Figure 4:
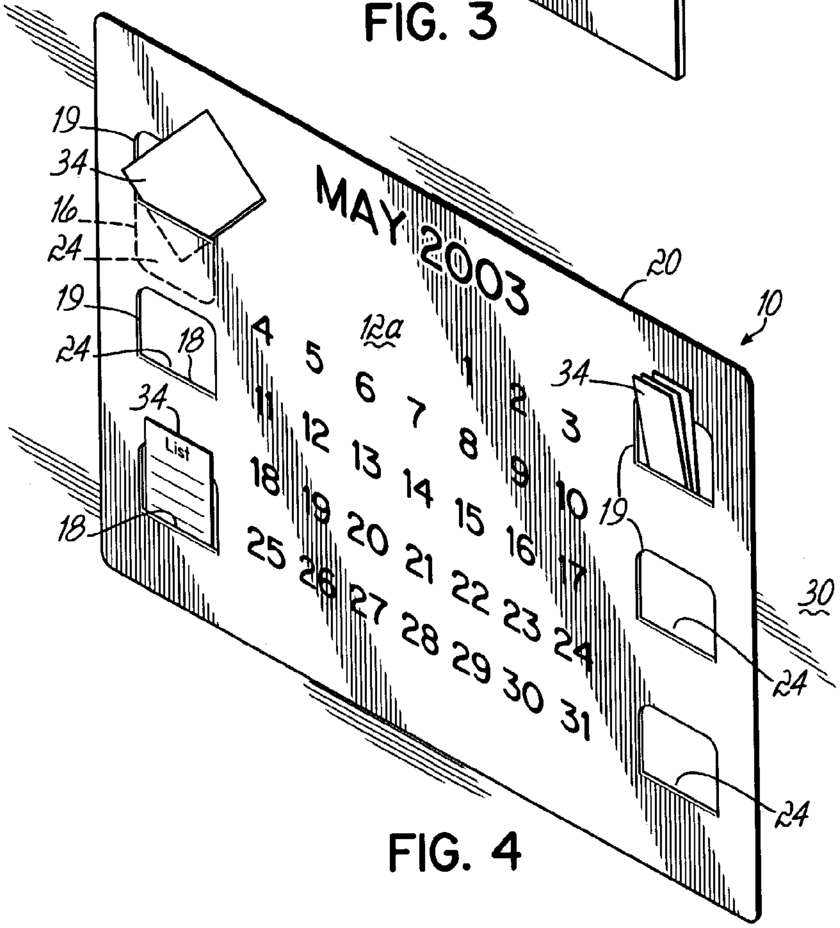
FIG. 4 is a perspective view of another embodiment of the present invention having a plurality of pockets formed within the perimeter of the sticker, for example, for use on a calendar page.

FIG. 4 depicts in perspective view an embodiment of a sticker substrate 10 of the present invention having a plurality of pockets 24 formed within the perimeter 20 of the sticker substrate 10. A monthly calendar, for example, may be printed on a front surface 12*a* of first section 12, such that reminders or lists or other objects 34 maybe placed in the pockets at the beginning or ends of the weeks. Another example for use of the sticker 10 of the present invention is a coin collection sticker substrate 10 having the 50 states printed on front surface 12*a* and a pocket 24 corresponding to each state for receiving the state quarter.

Figure 5:
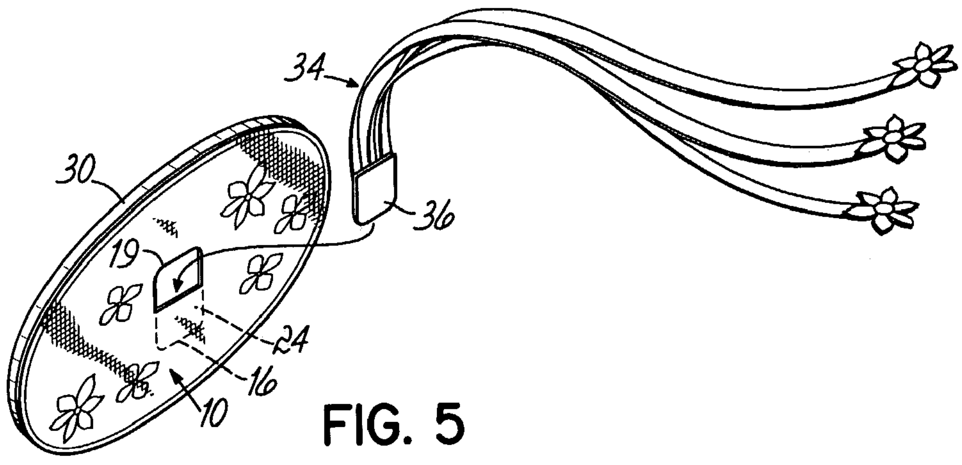
FIG. 5 is a perspective view of a sticker kit of the present invention for decorative hair barrettes.

FIG. 5 depicts in perspective view a sticker kit of the present invention having a sticker substrate 10 that may be adhered to a mounting surface 30, which is shown as a hair barrette, and an object 34 having a portion 36 thereof sized for inserting into the pocket 24 formed within the perimeter 20 of the sticker substrate 10. In this kit, a plurality of these sticker substrates 10 and objects 34 may be provided, to allow the child to match the design and/or color of the changeable barrette stickers with decorative ribbons.

Figure 6:
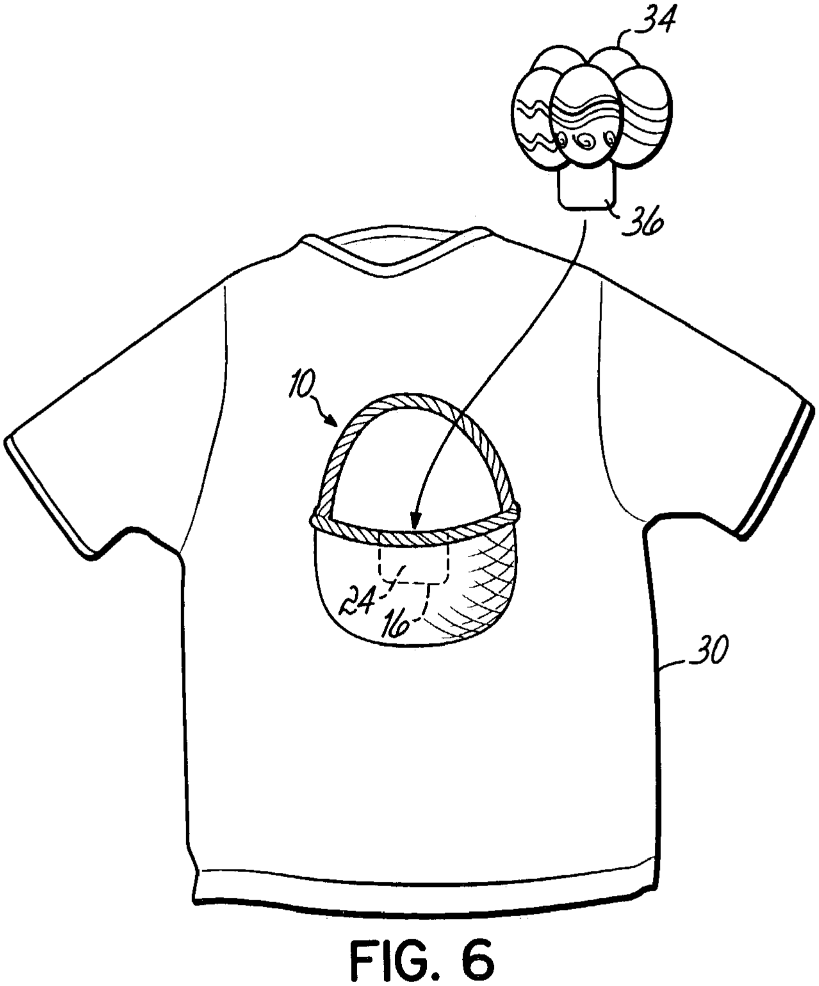
FIG. 6 is a perspective view of a sticker kit of the present invention for iron-on fabric stickers for applying to apparel.

FIG. 6 depicts in plan view an iron-on fabric sticker 10 applied to apparel 30. The iron-on fabric sticker 10 of the present invention has a heat-activated adhesive on the back surface (not shown) of the first section 12 for applying the fabric sticker 10 to a T-shirt or other item of apparel 30. A pocket 24 formed within the perimeter 20 of the fabric sticker 10 may allow for insertion of a portion 36 of an object 34 into the pocket 24 formed on the T-shirt 30.

Figure 7A:
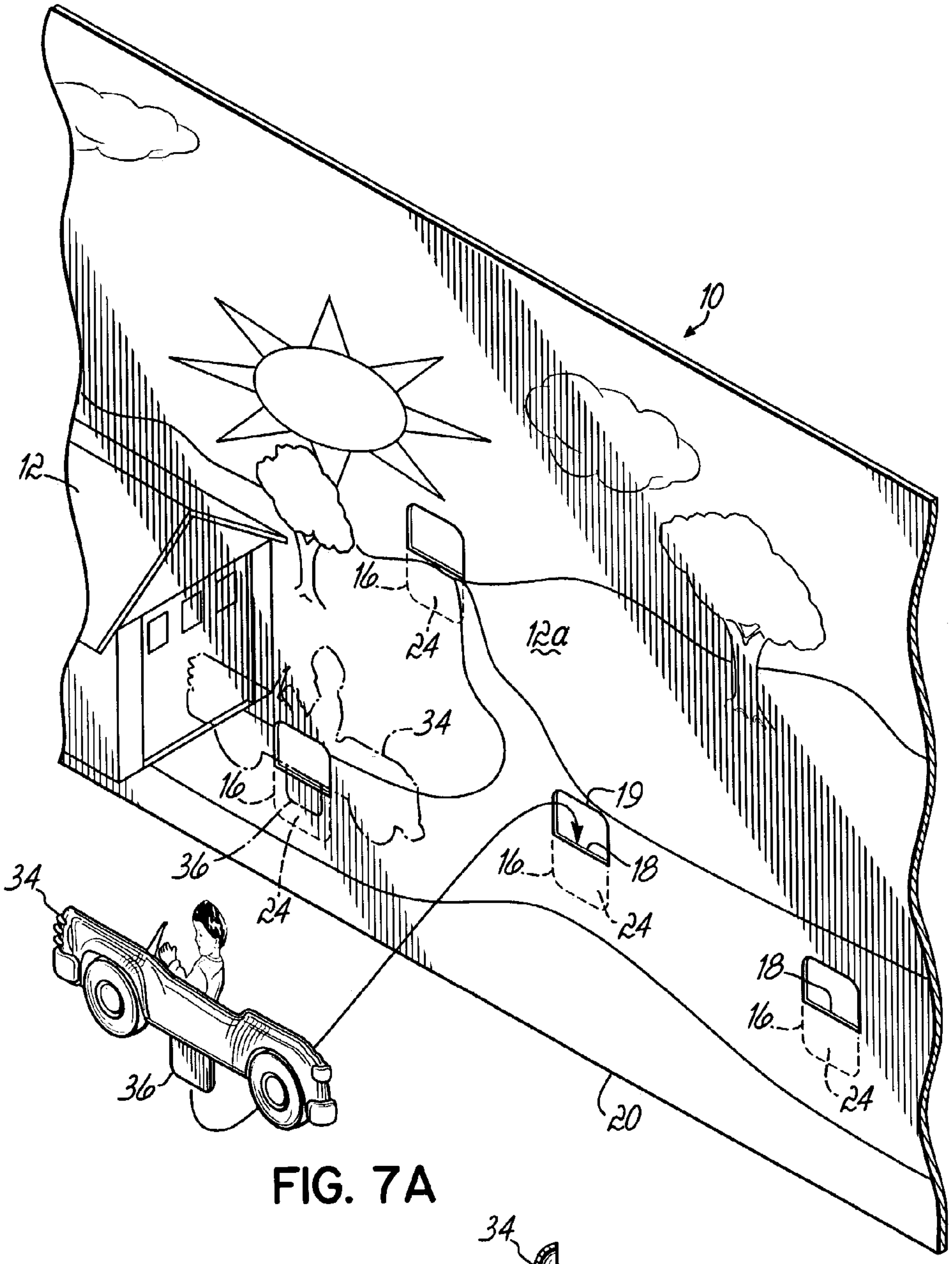
FIG. 7A depicts in perspective view a sticker kit having an object with a portion that is insertable into a plurality of pockets formed within the perimeter of the adhesive-backed sticker.
Figure 7B:
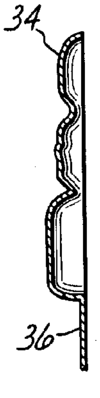
FIG. 7B is a cross-sectional view of a three-dimensional object for use in the kit of FIG. 7A.

FIG. 7A depicts in perspective view a sticker substrate 10 having a plurality of flap sections 16 folded back to create a plurality of pockets 24 within the perimeter 20 of the sticker substrate 10. A kit having the sticker substrate 10 may be provided, and further including one or more objects 34 having at least a portion 36 sized for inserting into the plurality of pockets 24. While the objects 34 may be thin, the invention also contemplates three-dimensional objects 34, such as that shown in 7B, which has a portion 36 of the object 34 sized to fit within the pockets 24, which portion is advantageously flat and thin. As shown, the front surface 12*a* of first section 12 is provided with printed graphics for presenting a play scene to a child where objects 34 may be moved from one position to another in the scene by means of the pockets 24.

Figure 8A:
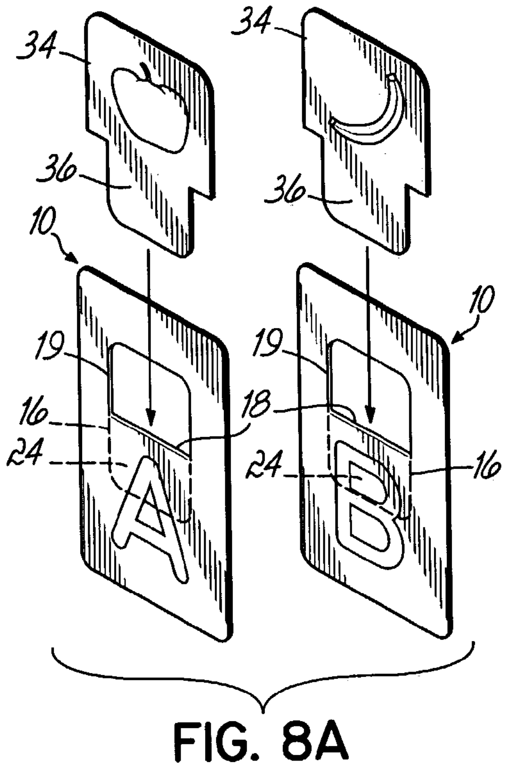
FIGS. 8A and 8B are perspective views of sticker kits of the present invention for educational use.
Figure 8B:
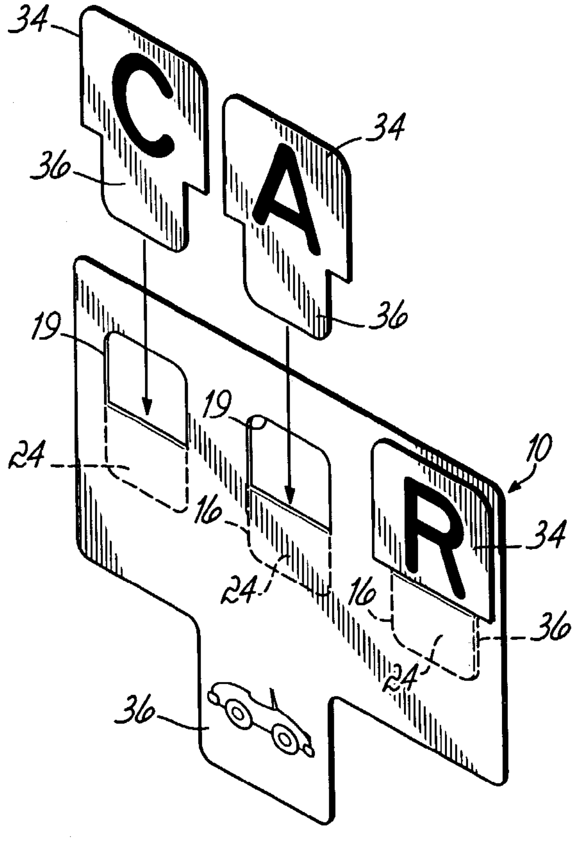

FIGS. 8A and 8B depict in perspective view a portion of an educational kit that incorporates sticker substrates 10 of the present invention having pockets 24 formed by folding flap sections 16. In FIG. 8A, a sticker substrate 10 is provided for each letter of the alphabet (only letters A and B shown here). Objects 34 are provided depicting various items such that a child can determine what the item is on the object 34, and insert a portion 36 of the object 34 into the pocket 24 of the sticker substrate 10 having the letter thereon that corresponds to the first letter of the item. Alternatively, as shown in FIG. 8B, an item may be depicted on the sticker substrate 10, with an appropriate number of pockets 24 formed in the sticker substrate 10 to receive the letters that spell the item. In addition, though not shown, the sticker substrate 10 of FIG. 8B depicting the item thereon may itself be adhered to a non-adhesive object 34 such that a portion 36 of the object 34 may be inserted into the appropriate pocket 24 of the kit in FIG. 8A. Thus, the sticker substrates 10 of the present invention may be used in educational activity kits that further have the benefit of honing the small motor skills of the child by the placement of the objects 34 in the pockets 24.

Figure 9:
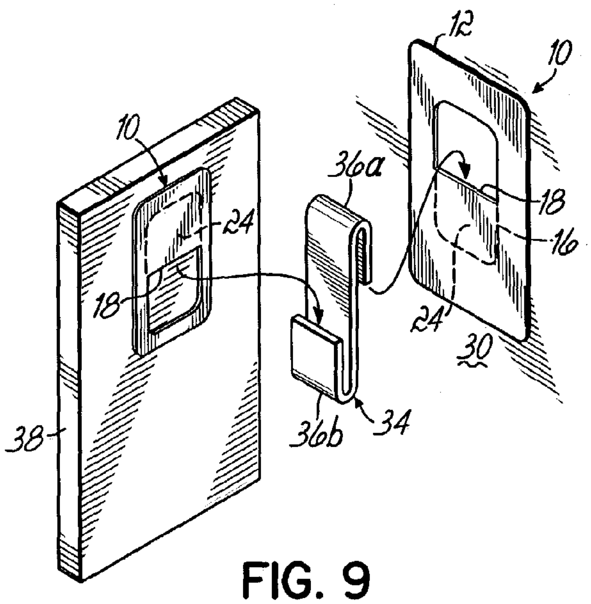
FIG. 9 is a perspective view of a sticker kit of the present invention having a pair of stickers with pockets formable therein and an object for connecting the two stickers by means of their respective pockets.

FIG. 9 depicts a sticker kit having a pair of stickers 10 and a non-adhesive object 34 that has opposing end portions 36*a*, 36*b* sized to be received within the pockets 24, such as an opposing hook accessory. In use, one of the sticker substrates 10 may be adhered to a wall or other mounting surface 30 and the second sticker substrate 10 is adhered to an item 38 to be hung on the mounting surface 30. As shown, the stickers 10 are positioned on the mounting surface 30 and the item 38 to be hung such that the pockets 24 are opposing pockets 24 for receiving the opposing end portions 36*a*, 36*b* of the opposing hook accessory 34.

Figure 10:
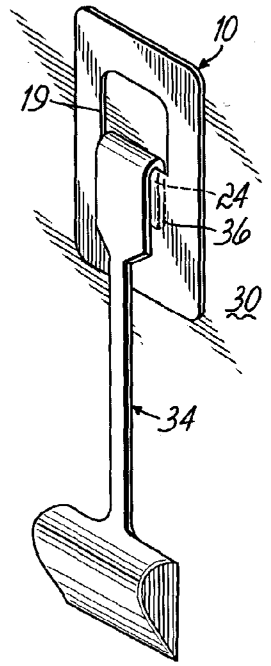
FIG. 10 is a perspective view of the use of a sticker of the present invention for hanging objects.
Figure 11:
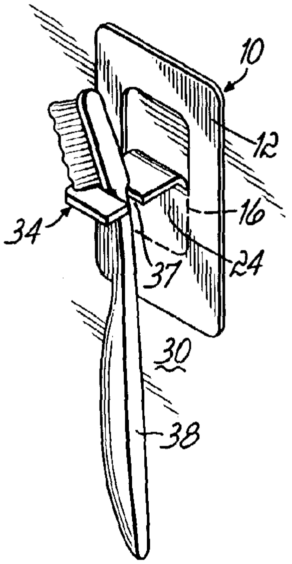
FIG. 11 is a perspective view of a sticker kit of the present invention for use in hanging objects.

FIGS. 10 and 11 depict in perspective view further uses for the sticker substrates 10 of the present invention. In FIG. 10, an object 34 has an end hook portion 36 inserted into the pocket 24 to hang the object 34 from the mounting surface 30. In this embodiment of hanging objects, heavier objects may be supported, because the force or load is straight down. For example, a snow shovel provided with an end hook portion 36 could be hung from a garage wall 30 by means of a sticker substrate 10 of the present invention adhered thereto. In FIG. 11, a portion 36 (not shown) of an object 34 is inserted into the pocket 24 and the object 34 extends outward from the mounting surface 30 and contains means 37 for hanging an item 38. For example, the means 37 may include a slot, a hook or any other known attachment means. This embodiment may not be as effective for hanging heavier objects, but provides more alternatives than the embodiment of FIG. 10. The sticker substrate 10 and object 34 may, for example, be used as a toothbrush holder, as shown, or key ring holder for hanging car keys.

Figure 12:
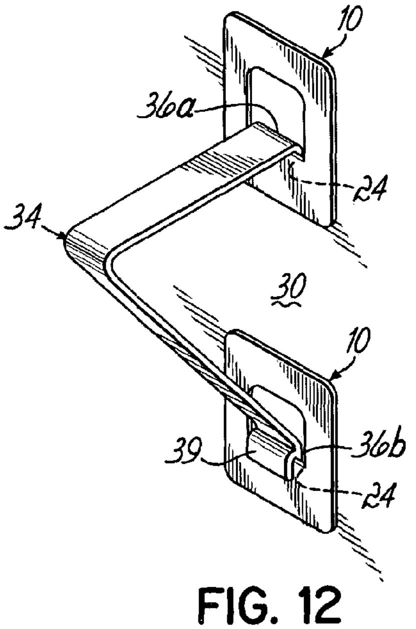
FIG. 12 is a perspective view of a sticker kit of the present invention for use in cantilevering of a support.

FIG. 12 depicts in perspective view a sticker kit having a pair of adhesive-backed stickers 10 of the present invention and a non-adhesive object 34 having opposing end portions 36*a*, 36*b* sized to be received by the pockets 24, wherein the object 34 permits cantilevering of a support further out from a wall or other mounting surface 30. A wrap-around lip 39 on the object 34 transfers more force downward to keep the object 34 from wedging the sticker substrate 10 off the mounting surface 30.

Figure 13:
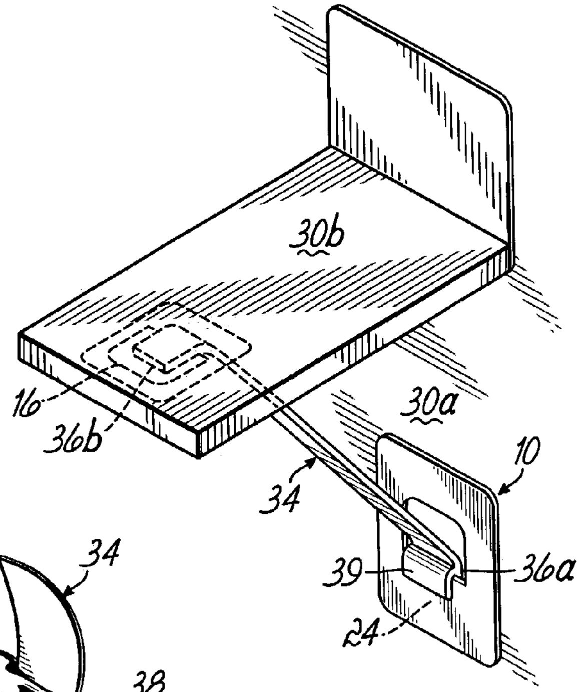
FIG. 13 is a perspective view of a sticker kit of the present invention for mounting a surface perpendicular to another surface.

FIG. 13 depicts in perspective view a sticker kit of the present invention having a pair of stickers 10, one of which is adhered to a vertical mounting surface 30*a*, and one of which is adhered to the underside of a horizontal mounting surface 30*b* extending from the vertical mounting surface 30*a*. An object 34 is provided having opposing end portions 36*a*, 36*b* that extend in perpendicular directions to each other, such that one end portion 36*a* is insertable in the pocket 24 on the vertical mounting surface 30*a* and the other end portion 36*b* is insertable in the pocket 24 on the horizontal mounting surface 30*b*, for bracing the horizontal mounting surface 30*b* relative to the vertical mounting surface 30*a*.

Figure 14:
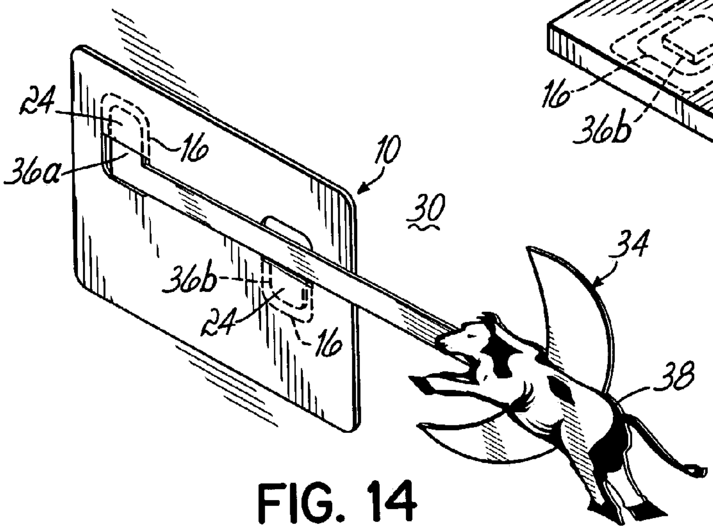
FIG. 14 is a perspective view of a sticker kit of the present invention for extending objects beyond the periphery of the sticker.

FIG. 14 depicts in perspective view a sticker kit of the present invention having two flap sections 16 within the perimeter 20 of sticker substrate 10 and extending from their respective fold line 18 in opposite directions, and spaced from each other in a perpendicular direction to the flap extending direction. An elongate object 34 is provided in the kit having one tab portion 36*a* extending up and another tab portion 36*b* extending down from an elongate object 34, such that upon insertion of the tab portions 36*a*, 36*b* into the respective pockets 24, an item 38 may be hung beyond the periphery 20 of the sticker substrate 10.

Figure 15:
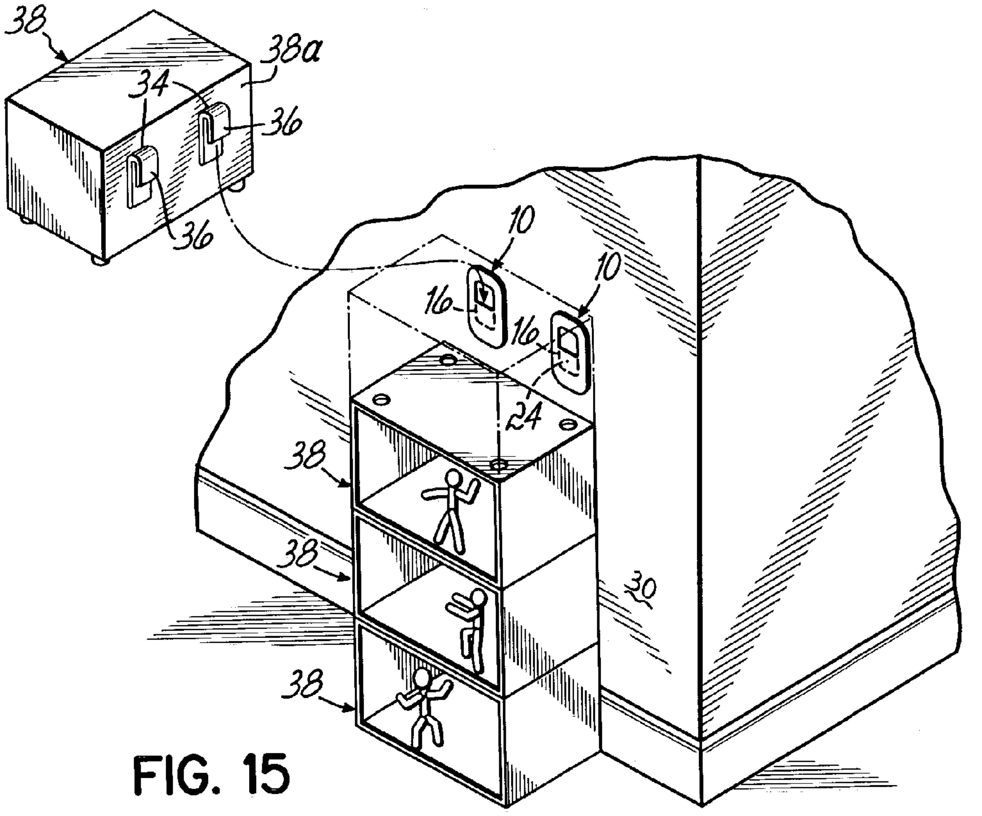
FIG. 15 is a perspective view of stickers of the present invention for securing a vertically-oriented item to a wall.

FIG. 15 depicts in perspective view the use of stickers 10 of the present invention for stabilizing a vertically-oriented or vertically stacked item 38 by connecting the item 38 to a mounting surface 30. One or more sticker substrates 10 of the present invention are provided having one or more flap sections 16 for forming one or more pockets 24 when the sticker substrate(s) 10 is adhered to the mounting surface 30. One or more objects 34 are adhered to a surface of the vertical item 38, advantageously toward the top of the item 38 on a back surface 38*a* thereof. The one or more objects 34 are provided with hook portions 36 sized for inserting into the pockets 24 of the sticker substrates 10. The sticker kit of FIG. 15 may be used, for example, for securing tall doll houses, CD cases, unitary vertical objects and stackable vertical objects to a wall.

Figure 16A:
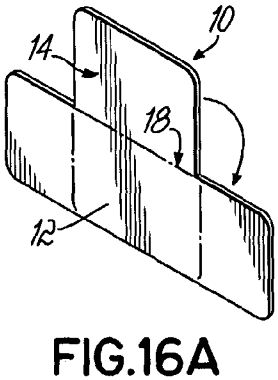
FIGS. 16A and 16B are perspective views of a sticker of the present invention having a through-pocket.
Figure 16B:
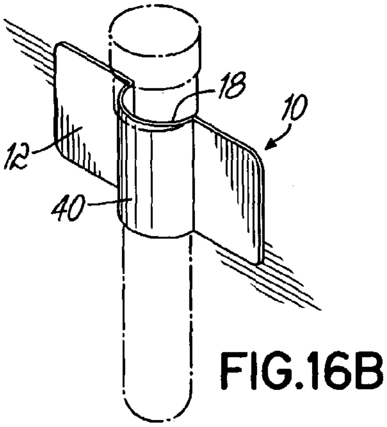

In the embodiments of FIGS. 1–15, the pockets 22, 24 are formed so as to be bound around the whole perimeter 23, 25 of the pocket 22, 24 excluding the fold line 18. FIGS. 16A and 16B depict an alternative embodiment in which a through-pocket 40 is formed, which essentially is an open-ended loop, with the first section 12 of the sticker substrate 10 extending beyond the pocket 40 in directions perpendicular to the direction that the flap section 14 extends from the fold line 18. In a direction opposite the flap section extending direction, the first section 12 does not extend beyond the flap section 14 when the flap section 14 is folded to create the pocket 40. Thus, an object 34 may be inserted into the through-pocket 40 so as to extend from the perimeter 20 of the sticker substrate 10 both adjacent to the fold line 18 and adjacent to the pocket 40 opposite the fold line 18, as shown in phantom. Though shown to form a vertical through-pocket 40, it may be understood that the sticker substrate 10 may be adhered to the mounting surface 30 to form horizontal or angled through-pockets 40. Similarly, the flap sections 14, 16 may be positioned to alter the direction of the through-pocket 40 from that shown.

Figure 17A:
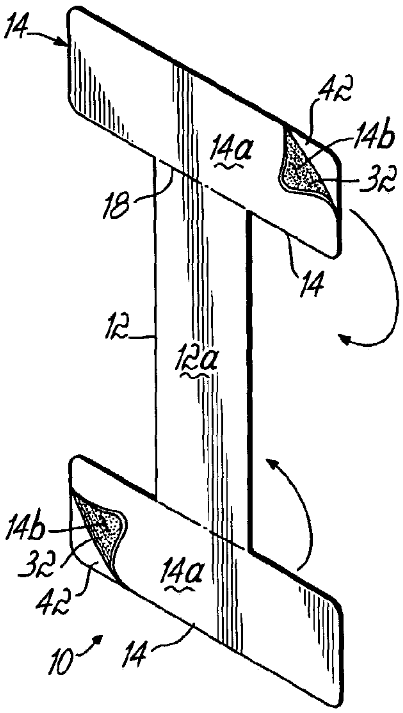
FIGS. 17A–17C are perspective views of a sticker of the present invention having two through-pockets and an exposed adhesive surface for sticking objects thereto.
Figure 17B:
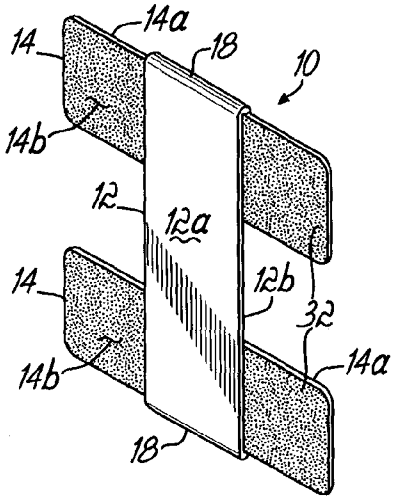
Figure 17C:
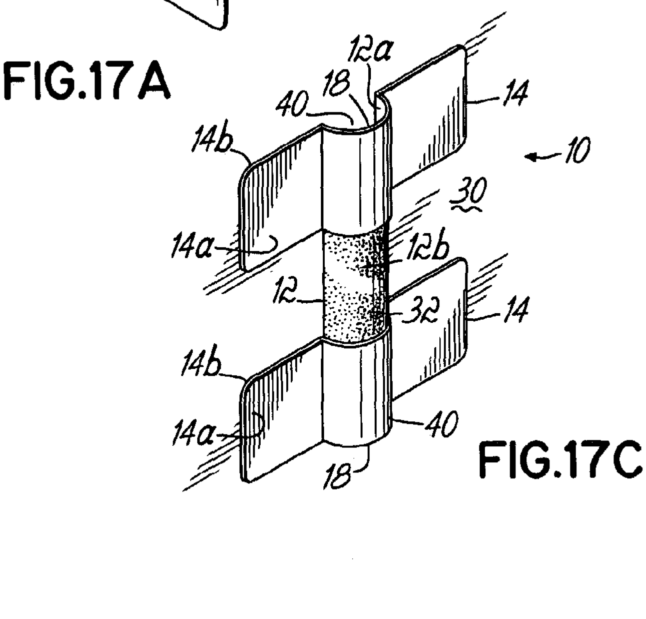

FIGS. 17A–17C depict an alternative embodiment for forming through-pockets in the sticker substrate 10. The sticker substrate 10 is die cut in an "H" pattern so as to have a first section 12 intermediate two flap sections 14, wherein the width of first section 12 is smaller than the width of the flap sections 14 and the flap sections 14 extend beyond the width of the main section 12 in both directions. To form the pockets 40, the sticker substrate 10 is removed from the release liner 42 and both flap sections 14 are folded back to adhere a portion of the back surface 14*b* to a portion of the back surface 12*b*. The resulting sticker substrate 10 is shown in FIG. 17B. To create the through-pockets 40, the sticker substrate 10 is adhered to a mounting surface 30 by adhering the exposed back surface 14*b* of the flap sections 14 to the mounting surface 30, with the exposed back surface 12*b* of the first section remaining exposed, as shown in FIG. 17C. Aligned through-pockets 40 are thereby created such that an object 34 may be inserted through the through-pockets 40, and behind the first section 12. The exposed back surface 12*b* of the first section may be used to tack objects 34, such as reminder notes, onto the sticker substrate 10.

The above-described figures depict a sampling of the various uses for the stickers 10 of the present invention, but the uses depicted therein are not inclusive of all uses for the invention. To the contrary, numerous uses of the sticker 10 and sticker kits of the present invention may be envisioned. The stickers 10 of the present invention having a pocket 22, 24 and/or 40 formed therein may be used, for example, in a wide variety of toys, games, activities, books, crafts, sticker play and scrap booking for both children and adults. The sticker pockets of the present invention may also be used in home, office and school organization. Seasonal use of the sticker pockets may also be made, such as hanging Christmas cards or stockings and for creating holiday shirts by use of iron-on fabric pockets. The stickers 10 of the present invention having the pockets 22, 24 and/or 40 formed therein may also be used in medical files or other types of files for case management, in vehicles for securing maps, pens or other items, for pharmaceuticals, such as on medication bottles to hold instruction sheets, as body decoration, etc. Thus, the mounting surface 30 to which the adhesive backed stickers of the present invention may be applied are varied, and include, by way of example only, such surfaces as walls, furniture, appliances, photo album or scrapbook pages, file folders, bottles, boxes, the human body, fabric, etc.

Advantageously, the sticker substrates 10 of the present invention are provided on a release liner 42, such as that shown in FIG. 1A. In use, the sticker substrate 10 may then be removed from the liner 42, the flap sections 14 and/or 16 folded back to adhere them to the first section 12, and the sticker substrate applied to a mounting surface 30 to form the pockets 22, 24 and/or 40. The sticker substrates may be made out of any appropriate material such as paper, vinyl or mylar. The size of the sticker substrate 10 and the material from which it is made may be engineered for the application. The front surface 12*a* of the sticker substrate 10 may be printed with what ever graphics are desired. The back surfaces 12*b*, 14*b* and 16*b* may be completely covered with adhesive 32, in either blanket coverage or a patterned coverage, as is well known in the art. Alternatively, adhesive 32 may be applied on at least a portion of one of the back surface 14*b* (or 16*b*) of the flap section 14 (or 16) and a first region of the back surface 12*b* of the first section 12, such that upon folding back the flap section 14 (or 16), adhesive 32 on at least one of the two back surfaces 14*b* (or 16*b*) or 12*b* binds the flap section 14 (or 16) to the first section 12. Adhesive 32 is also advantageously applied on at least a portion of a second region of the back surface 12*b* of the first section 12 to enable the sticker substrate 10 to be adhered to a mounting surface 30. However, in the embodiment of FIGS. 17A–17C, the adhesive 32 may be absent from the second region of the back surface 12*b* of the first section 12 because the sticker substrate 10 is adhered to the mounting surface 30 by the exposed adhesive 32 on back surface 14*b* of the flap sections 14. It is noted, however, that for ease of manufacturing, a blanket or patterned adhesive is applied to the entire back surface of the sticker substrate 10.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. An adhesive-backed sticker for adhering to a mounting surface and forming a pocket therewith, comprising:

a sticker substrate having a first section and at least one flap section adjacent the first section with a fold line therebetween, wherein the at least one flap section extends from the fold line away from a perimeter of the first section in a first length-wise direction, and the flap section and the first section are of equal length, wherein the first section extends beyond the fold line in both directions perpendicular to the first length-wise direction whereby the first section has a width greater than the width of the flap section at the fold line, wherein the first section and the flap section each having a front surface and a back surface, and each of the back surfaces includes an adhesive for adhering at least a portion of the sticker substrate to a mounting surface, wherein the at least one flap section is foldable at the fold line to adhere the back surface of the flap section to the back surface of the first section, and wherein, upon folding the flap section along the fold line, the first section is coextensive with the flap section in a direction opposite the first direction whereby a through-pocket is formed between the sticker substrate and said mounting surface in registry with the flap section.

2. The sticker of claim 1 comprising a plurality of the flap sections.

3. An adhesive-backed sticker for adhering to a mounting surface and forming a pocket therewith, comprising:

a sticker substrate having a first section and at least one flap section located within a perimeter of the first section, wherein a perimeter of the flap section is defined by a fold line and a die cut line, the first section and the flap section each having a front surface and a back surface, wherein each of the back surfaces includes an adhesive for adhering at least a portion of the sticker substrate to a mounting surface, and wherein the at least one flap section is foldable at the fold line to adhere the back surface of the flap section to the back surface of the first section and to thereby create a pocket between the sticker substrate and said mounting surface in registry with at least a portion of the flap section.

4. The sticker of claim 3 comprising a plurality of the flap sections.

5. The sticker of claim 3 wherein, upon folding the flap section along the fold line, a void is created within the perimeter of the first section, the sticker further comprising a sticker insert sized to fill the void.

6. The sticker of claim 3 wherein the at least one flap section includes a first pair of opposing flap sections located within the perimeter of the first section, each extending from the respective fold line in a direction opposite the other flap section in the pair, whereby opposing pockets are formed upon adhering the sticker substrate to said mounting surface for receiving opposing ends of an object.

7. The sticker of claim 6 further comprising a second pair of opposing flap sections located within the perimeter of the first section, each extending from the respective fold line in a direction opposite the other flap section in the pair, wherein the first and second pairs are positioned to receive respective opposing corners of a quadrilateral object upon adhering the sticker substrate to said mounting surface.

8. An adhesive-backed sticker for adhering to a mounting surface and forming a pocket therewith, comprising: a sticker substrate having a first section and two flap sections adjacent opposing ends of the first section with a respective fold line between the first section and each of the respective two flap sections, and each of the two flap sections extending to a width greater than a width of the first section, the first section and the flap sections each having a front surface and a back surface, wherein each of the back surfaces includes an adhesive for adhering at least a portion of the sticker substrate to a mounting surface, and wherein the two flap sections are foldable at the respective fold lines to adhere a portion of the back surface of each of the two flap sections to the back surface of the first section and wherein, upon folding the two flap sections along the respective fold lines to form two pockets, the back surfaces of the two flap sections extending beyond the pockets are adapted to be adhered to said mounting surface with the back surface of the first section between the pockets exposed for sticking objects thereto and whereby the pockets formed are through-pockets.

9. The sticker of claim 3 wherein the adhesive is a permanent adhesive adapted to permanently adhere the sticker to the mounting surface.

10. The sticker of claim 9 wherein the adhesive is heat activated.

11. The sticker of claim 3 wherein the adhesive is a non-permanent adhesive adapted to releasably adhere the sticker to the mounting surface.

12. The sticker of claim 3 wherein the sticker substrate is releasably adhered to a release liner.

13. A sticker kit comprising the adhesive-backed sticker of claim 3 and at least one non-adhesive object having at least a portion thereof sized to be removably received by the pocket between the sticker substrate and said mounting surface upon adhering the sticker substrate to said mounting surface.

14. The sticker kit of claim 13 wherein the at least one flap section includes a plurality of flap sections for forming a plurality of pockets, and further comprising a plurality of the non-adhesive objects sized to be removably receivable by the plurality of pockets.

15. The sticker kit of claim 13 wherein the non-adhesive object includes means for receiving another object.

16. A sticker kit comprising an adhesive-backed sticker for adhering to a mounting surface and forming a pocket therewith, and at least one non-adhesive object having at least a portion thereof sized to be removably received by the pocket between the sticker substrate and said mounting surface upon adhering the sticker substrate to said mounting surface, wherein the adhesive-backed sticker comprises a sticker substrate having a first section and at least one flap section adjacent the first section with a fold line therebetween, wherein the at least one flap section extends from the fold line away from a perimeter of the first section in a first length-wise direction to a length less than an opposing length of the first section, and wherein the first section extends beyond the fold line in both directions perpendicular to the first length-wise direction whereby the first section has a width greater than the width of the flap section at the fold line, the first section and the flap section each having a front surface and a back surface, wherein each of the back surfaces includes an adhesive for adhering at least a portion of the sticker substrate to a mounting surface, and wherein the at least one flap section is foldable at the fold line to adhere the back surface of the flap section to the back surface of the first section, and wherein, upon folding the flap section along the fold line, the first section extends beyond the pocket in directions perpendicular to the first direction and in a direction opposite the first direction whereby the back surface of the first section is adapted to be adhered to said mounting surface around a perimeter of the pocket excluding the fold line to enclose the portion of the object therein with any remaining portion of the object protruding from the perimeter of the first section in the first direction.

17. A sticker kit comprising adhesive-backed sticker of claim 1 and at least one non-adhesive object having at least a portion thereof sized to be removably received by the pocket formed between the sticker substrate and said mounting surface upon adhering the sticker substrate to said mounting surface and whereby the pocket formed is a through-pocket through which the portion of the object may extend.

18. The sticker kit of claim 1 wherein, upon folding the flap section along the fold line, a void is created within the perimeter of the first section, the sticker kit further comprising a sticker insert sized to fill the void.

19. The sticker kit of claim 1 wherein the sticker substrate is releasably adhered to a release liner.

20. A sticker kit comprising a pair of the adhesive-backed stickers of claim 3 and at least one non-adhesive object having opposing end portions sized to be received by the pockets formed between the sticker substrates and first and second mounting surfaces upon adhering the sticker substrates to said first and second mounting surfaces.

21. The sticker kit of claim 20 wherein the opposing end portions extend in perpendicular directions whereby the kit is adapted for adhering the stickers to respective perpendicular first and second mounting surfaces with the object adapted to extend therebetween to brace said first mounting surface perpendicular to said second mounting surface.

22. The sticker kit of claim 20 wherein the sticker substrate is releasably adhered to a release liner.

23. A sticker kit comprising the adhesive-backed sticker of claim 3 and at least one object having a first adhesive surface and a second surface with a projection therefrom sized to be received by the pocket between the sticker substrate and said mounting surface upon adhering the sticker substrate to said mounting surface, whereby the object, upon adherence to another mounting surface is adapted to connect said mounting surfaces.

24. The sticker kit of claim 23 wherein the sticker substrate is releasably adhered to a release liner.

25. An adhesive-backed sticker for adhering to a mounting surface and forming a packet therewith, comprising:

- a sticker substrate having a first section and at least one flap section located within a perimeter of the first section, and a perimeter of the flap section is defined by a fold line and a die cut line, the first section and the flap section each having a front surface and a back surface; and
- an adhesive on at least a portion of one of the back surface of the flap section and a first region of the back surface of the first section, and further on at least a portion of a second region of the back surface of the first section,
- wherein the at least one flap section is foldable at the fold line to adhere the back surface of the flap section to the first region of the back surface of the first section and to thereby create a pocket between the sticker substrate and said mounting surface in registry with the flap section when the second region of the back surface of the first section is adhered to said mounting surface.

26. The sticker of claim 25 wherein the adhesive is on the entire first region of the back surface of the first section, and the back surface of the flap section is free of adhesive.

27. The sticker of claim 26 wherein the adhesive is on the entire second region of the back surface of the first section.

28. The sticker of claim 25 wherein the adhesive is on the entire second region of the back surface of the first section.

29. The sticker of claim 25 wherein the adhesive is a permanent adhesive adapted to permanently adhere the sticker to said mounting surface.

30. The sticker of claim 25 wherein the adhesive is a non-permanent adhesive adapted to releasably adhere the sticker to the mounting surface.

31. The sticker of claim 25 wherein the sticker substrate is releasably adhered to a release liner.

32. A sticker kit comprising the adhesive-backed sticker of claim 25 and at least one non-adhesive object having at least a portion thereof sized to be removably received by the pocket between the sticker substrate and said mounting surface upon adhering the sticker substrate to said mounting surface.

33. The sticker kit of claim 32 wherein the at least one flap section includes a plurality of flap sections for forming a plurality of pockets, and further comprising a plurality of the non-adhesive objects sized to be removably received by the plurality of pocket.

34. The sticker kit of claim 32 wherein the sticker substrate is releasably adhered to a release liner.

35. The sticker kit of claim 16 wherein the non-adhesive object includes means for receiving another object.

36. The sticker kit of claim 35, wherein the means for receiving another object is a slot or a hook.

37. The sticker kit of claim 15, wherein means for receiving another object is a slot or a hook.

38. An adhesive-backed sticker for adhering to a mounting surface and forming a pocket therewith, comprising:

- a sticker substrate having a first section and at least one flap section, wherein the at least one flap section is defined by a fold line within a perimeter of first section and a die cut line,
- the first section and the flap section each having a front surface and a back surface, wherein each of the back surfaces includes an adhesive for adhering at least a portion of the sticker substrate to a mounting surface, and
- wherein the at least one flap section is foldable at the fold line to adhere the back surface of the flap section to the back surface of the first section and to thereby create a pocket between the sticker substrate and said mounting surface in registry with at least a portion of the flap section.

39. A sticker kit comprising the adhesive-backed sticker of claim 38 and at least one non-adhesive object having at least a portion thereof sized to be removably received by the pocket between the sticker substrate and said mounting surface upon adhering the sticker substrate to said mounting surface.

* * * * *

UNITED STATES PATENT AND TRADEMARK OFFICE

CERTIFICATE OF CORRECTION

PATENT NO. : 6,967,046 B2

DATED : November 22, 2005

INVENTOR(S) : Bollinger et al.

It is certified that error appears in the above-identified patent and that said Letters Patent is hereby corrected as shown below:

Column 11,

Line 1, “comprising adhesive-backed” should read -- comprising the adhesive-backed --.

Lines 9 and 13, “The sticker kit of claim 1” should read -- The sticker kit of claim 13 --.

Line 40, “forming a packet therein” should read -- forming a pocket therein --.

Column 12,

Line 23, “plurality of pocket” should read -- plurality of pockets --.

Signed and Sealed this

Seventh Day of March, 2006

JON W. DUDAS

*Director of the United States Patent and Trademark Office*